(12) United States Patent
Waser

(10) Patent No.: US 11,060,603 B2
(45) Date of Patent: Jul. 13, 2021

(54) TRANSMISSION ARRANGEMENT FOR A MOTOR VEHICLE

(71) Applicant: MAGNA Powertrain GmbH & Co KG, Lannach (AT)

(72) Inventor: Helmut Martin Waser, Graz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 553 days.

(21) Appl. No.: 15/778,023

(22) PCT Filed: Nov. 24, 2016

(86) PCT No.: PCT/EP2016/078681
§ 371 (c)(1),
(2) Date: May 22, 2018

(87) PCT Pub. No.: WO2017/093117
PCT Pub. Date: Jun. 8, 2017

(65) Prior Publication Data
US 2018/0347687 A1    Dec. 6, 2018

(30) Foreign Application Priority Data
Dec. 4, 2015    (DE) .................... 10 2015 224 347.8

(51) Int. Cl.
*F16H 57/04*    (2010.01)
*F16D 23/12*    (2006.01)
(Continued)

(52) U.S. Cl.
CPC ..... *F16H 57/0447* (2013.01); *F01M 11/0408* (2013.01); *F01M 11/061* (2013.01);
(Continued)

(58) Field of Classification Search
CPC ............. F16H 57/0447; F16H 57/0449; F16H 57/0436; F16H 57/0441; F16H 57/045;
(Continued)

(56) References Cited

U.S. PATENT DOCUMENTS 3,249,189 A    5/1966  Schjolin et al.
4,658,665 A *  4/1987  Strinzel ............... F16H 57/0442
                                              184/6.12
(Continued)

FOREIGN PATENT DOCUMENTS

DE    1047820 A    12/1958
DE    3209514 A1    9/1983
(Continued)

OTHER PUBLICATIONS

International Search Report and Written Opinion dated Mar. 6, 2017 from International Patent Application Serial No. PCT/EP2016/078681.
German Search Report dated Jul. 18, 2016 from German Patent Application No. 10 2015 224 347.8.

*Primary Examiner* — Michael R Mansen
*Assistant Examiner* — Robert T Reese
(74) *Attorney, Agent, or Firm* — Dickinson Wright PLLC

(57) ABSTRACT

Transmission arrangement for a motor vehicle, comprising at least one clutch unit and at least one actuator unit that allows the clutch unit to be actuated; the actuator unit additionally allows a pump to be actuated such that lubricant is pumped from a lubricant sump into a lubricant reservoir.

18 Claims, 10 Drawing Sheets

Figure 1:
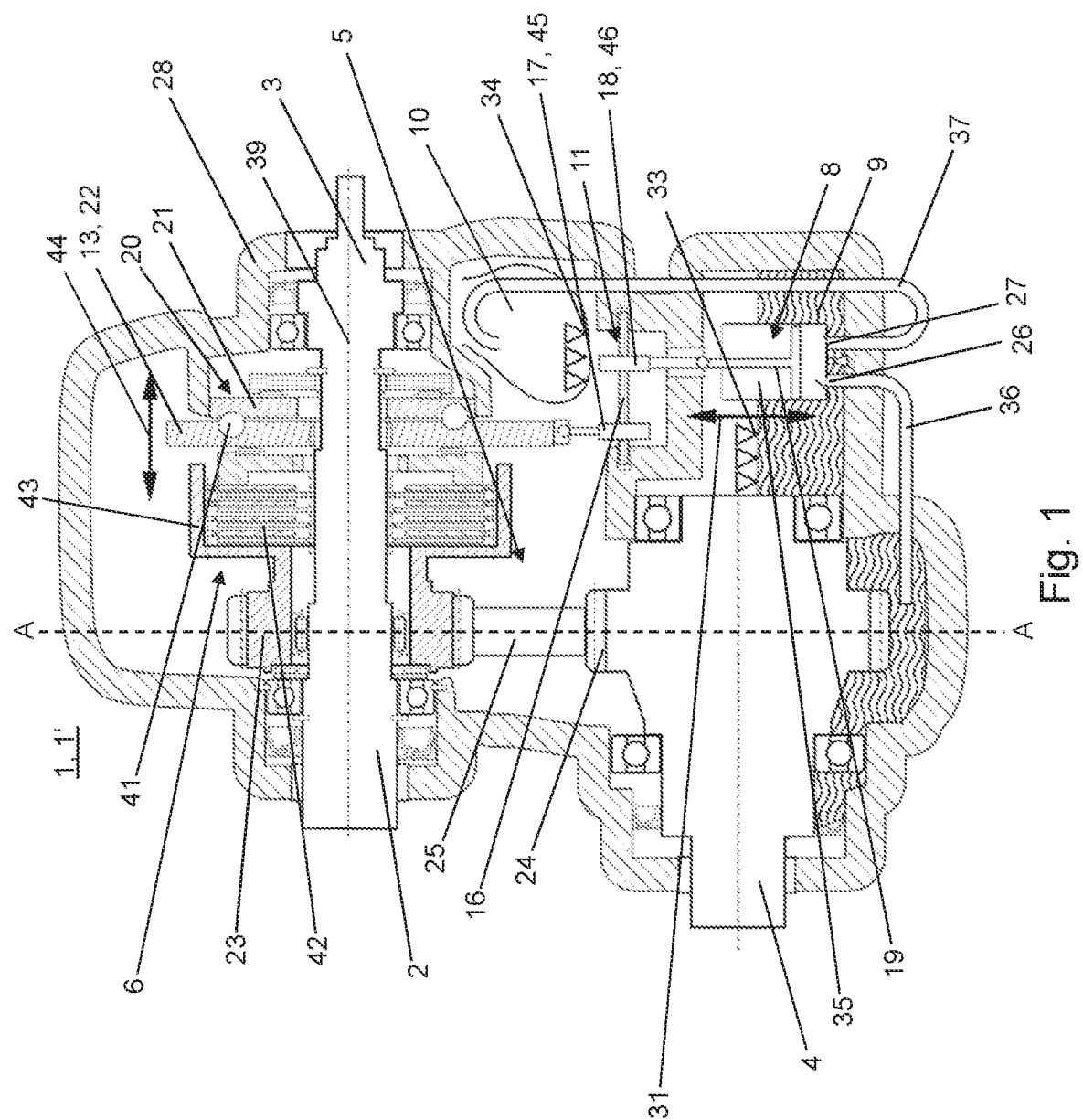

(51) Int. Cl.
 *F04B 9/04* (2006.01)
 *F04B 19/22* (2006.01)
 *F01M 11/06* (2006.01)
 *F01M 11/04* (2006.01)
 *F16D 13/52* (2006.01)

(52) U.S. Cl.
 CPC .............. *F04B 9/042* (2013.01); *F04B 19/22* (2013.01); *F16D 23/12* (2013.01); *F16H 57/045* (2013.01); *F16H 57/0436* (2013.01); *F16H 57/0441* (2013.01); *F16H 57/0457* (2013.01); *F16D 13/52* (2013.01); *F16D 2023/123* (2013.01)

(58) Field of Classification Search
 CPC .. F16H 57/0457; F01M 11/06; F01M 11/061; F01M 11/0408
 See application file for complete search history.

(56) References Cited

U.S. PATENT DOCUMENTS

| | | | |
|---|---|---|---|
| 5,158,152 | A * | 10/1992 | Nemoto .............. F16H 57/0447 184/6.12 |
| 2007/0026983 | A1 | 2/2007 | Shimizu et al. |
| 2015/0152955 | A1* | 6/2015 | Feichtner .............. F16H 57/045 474/86 |

FOREIGN PATENT DOCUMENTS

| | | |
|---|---|---|
| DE | 3220746 A1 | 12/1983 |
| DE | 223205 A1 | 6/1985 |
| DE | 10051356 A1 | 4/2002 |
| EP | 1452778 A2 | 9/2004 |
| JP | 2009250415 A1 | 10/2009 |

* cited by examiner

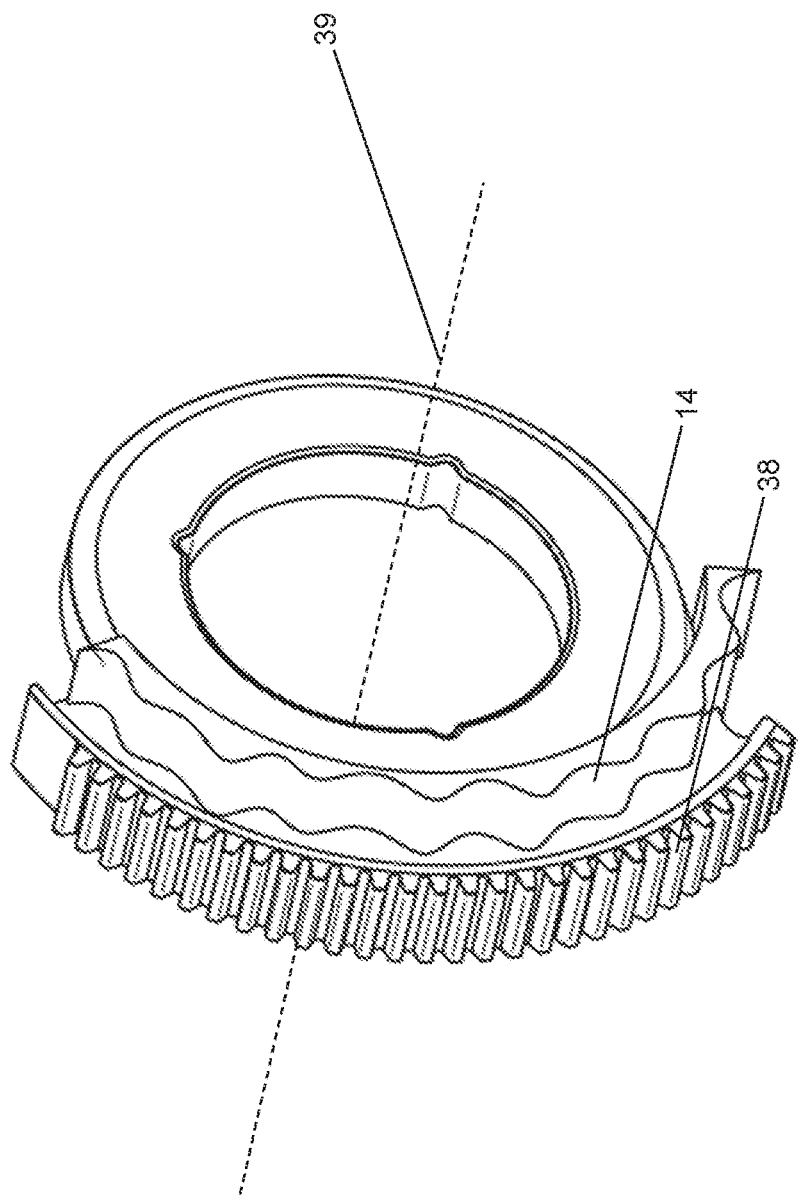

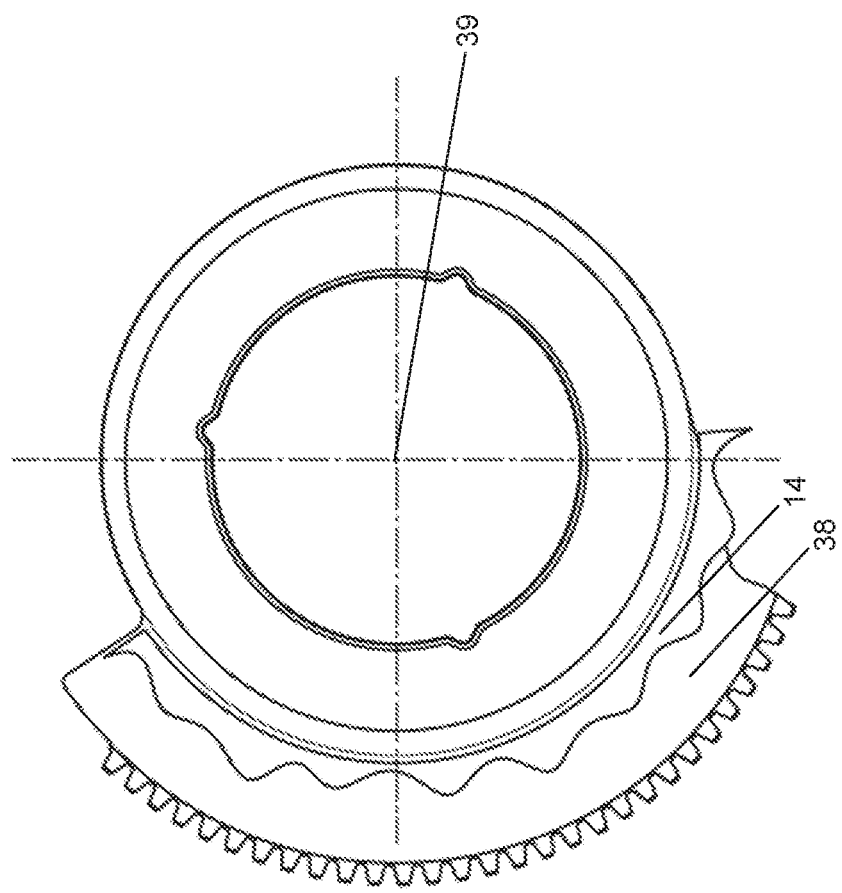

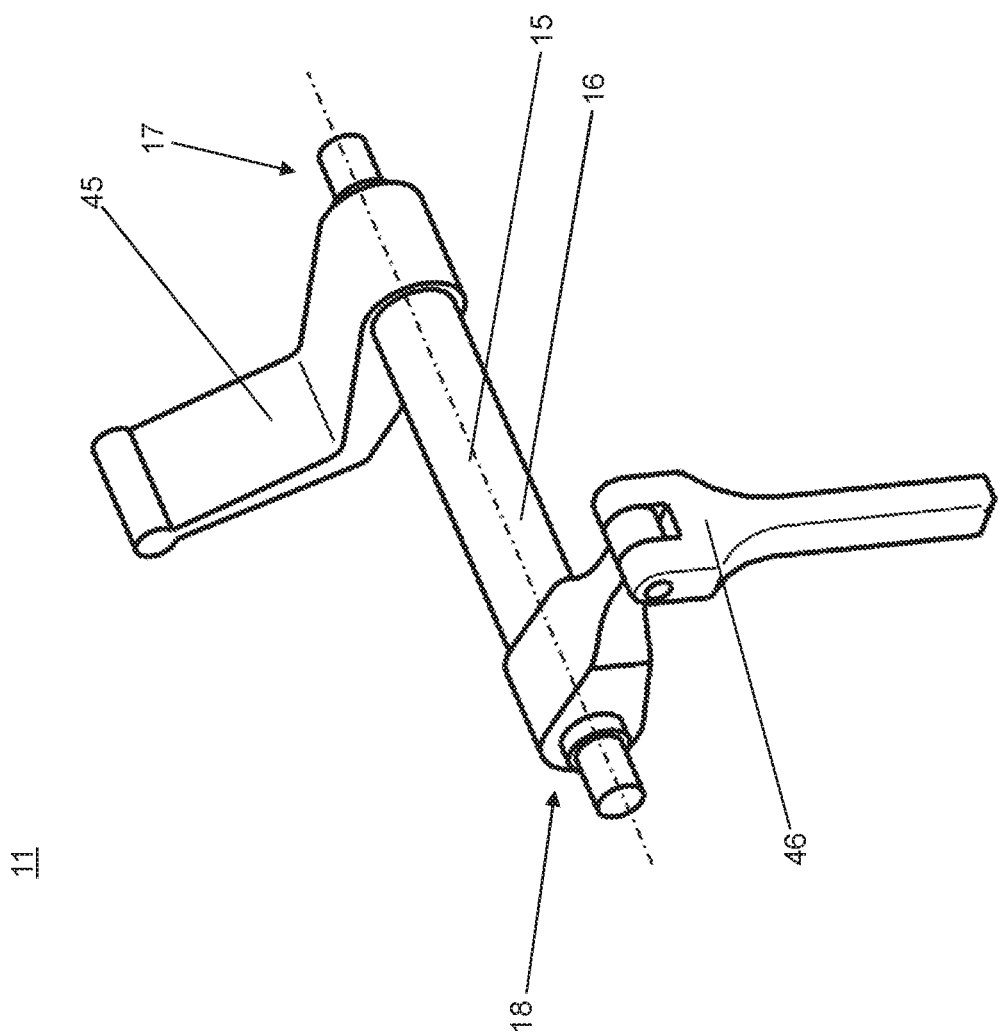

TRANSMISSION ARRANGEMENT FOR A MOTOR VEHICLE

CROSS-REFERENCE TO RELATED APPLICATIONS

This application is a National Stage of International Application No. PCT/EP2016/078681, filed Nov. 24, 2016, which claims the benefit and priority of German Application No. 10 2015 224 347.8, filed Dec. 4, 2015. The entire disclosures of each of the above applications are incorporated herein by reference.

TECHNICAL FIELD

The present invention relates to a transmission arrangement for a motor vehicle comprising at least one clutch unit and at least one actuator unit, it being possible for the clutch unit to be actuated by means of the actuator unit.

BACKGROUND

In drive trains for motor vehicles of all types, a very wide variety of transmission arrangements are used, but, in particular, non-positive and/or positively locking transmission arrangements. Transmission arrangements of this type as a rule require a transmission lubrication means, in order for it to be possible to ensure reliable operation which is optimized in terms of the service life.

Different lubricating methods can be applied for transmission lubrication, immersion lubrication and lubricant circulation lubrication or spray lubrication being known lubricating methods. In the case of immersion lubrication, the lubricant is transported by way of rotating parts of the transmission arrangement to lubricating points. In the case of lubricant circulation lubrication or spray lubrication, lubricant is conveyed by means of a lubricant pump via lubricant lines to the lubricating points.

For example, transfer cases are used, in particular, in the case of motor vehicles with all wheel drive. They serve to distribute a torque which is generated by the drive engine and is provided at an input shaft of the transfer case to at least two output shafts of the transfer case which are drive-connected in each case to motor vehicle axles.

Along the power flow from the drive engine of the motor vehicle to the driven axle of the motor vehicle, the transfer case is usually arranged downstream of the main transmission of the drive engine, which main transmission serves to set transmission ratios for the torque which is generated by the drive engine.

In the case of clutch-controlled transfer cases, the power flow is split via an automatically and/or manually actuated clutch, usually a multiple disk clutch, to two output shafts.

Clutch-controlled transfer cases allow one of the two output shafts of the transfer case to be coupled to and/or to be decoupled from the input shaft.

Transfer cases often have an offset drive, either the output shafts having an axial offset with respect to one another and/or one or both output shafts having an axial offset with respect to an input shaft which is connected or can be connected to the drive engine of a motor vehicle. Gearwheel mechanisms and/or flexible drive mechanisms are preferably used as offset drives. Flexible drive mechanisms have a traction mechanism which acts via two gearwheels and transmits drive power between the shafts which have an axial offset. A chain or a belt serves as a rule as a traction mechanism.

The traction mechanism and/or the gearwheel set of the transfer case are/is usually additionally used to convey oil from a lower oil sump to one or more higher points of the transfer case which are to be lubricated and/or cooled. In conventional transfer cases, the traction mechanism of the flexible drive mechanism and/or at least one gearwheel of the gearwheel mechanism splash/splashes in the lubricant sump to this end, and transports lubricant into a lubricant reservoir, the lubricant being forwarded from there by way of suitable lubricant guiding devices to the points which are to be lubricated and/or cooled. As a result, the lubricant level in the lubricant sump drops. Here, the transport of the lubricant is dependent on the speed of the traction mechanism and/or the at least one gearwheel. When the offset drive is started up, the entire lubricant quantity is situated in the lubricant sump, and the lubricant filling level in the lubricant sump reaches a maximum. As a result of the high lubricant filling level, increased splashing losses or drag torques occur, in particular, in the phase of starting up of the transfer case. Furthermore, the transport of lubricant is only restricted or is even impossible at low rotational speeds of the traction mechanism and/or the gearwheel which splashes at least partially in the lubricant sump: in this phase, from no drop to merely a low drop of the lubricant filling level in the lubricant sump likewise occurs, which in turn entails an increase in the splashing losses or the drag losses.

In this context, for example, document DE 100 51 356 A1 describes a transmission for a reciprocating piston internal combustion engine having an oil sump and an oil pump which is assigned to the oil sump for a main oil circuit. The oil sump is assigned at least one additional oil supply which is operatively connected to the oil pump. This achieves a situation where the oil level which prevails in the transmission can be varied in accordance with the individual driving ranges or operating points. It is possible at every time to reduce the existing sump oil level, in order to avoid unnecessary splashing effort.

SUMMARY

The invention is based on the object of configuring a transmission arrangement in such a way that a reduction of drag losses and reliable operation of the transmission arrangement are ensured in a simple way, a particularly cost-efficient construction being realized, in particular, by way of synergetic utilization of an actuator unit.

The object is achieved by way of a transmission arrangement for a motor vehicle comprising at least one clutch unit and at least one actuator unit, it being possible for the clutch unit to be actuated by means of the actuator unit, it additionally being possible for a pump to be actuated by means of the actuator unit, with the result that lubricant is conveyed from a lubricant sump into a lubricant reservoir.

In accordance with the present invention, the transmission arrangement comprises at least one clutch unit and at least one actuator unit.

According to the invention, the actuator unit serves to actuate the clutch unit.

According to the invention, a pump can additionally be actuated by means of the actuator unit, with the result that lubricant is conveyed from a lubricant sump into a lubricant reservoir.

For example, every type of liquid coolants/lubricants are to be understood as lubricant, for example (transmission) oil. The lubricant serves to lubricate and/or cool transmission components.

The pump can actively transport lubricant out of the lubricant sump into the lubricant reservoir in a simple way, and can thus reduce the lubricant filling level in the lubricant sump, with the result that drag losses are minimized over all operating ranges of the transmission arrangement according to the invention. As a result, reliable operation of the transmission arrangement can be ensured with a reduced splashing power loss, which in turn entails an optimization of the degree of efficiency of the transmission arrangement. In addition, the embodiment according to the invention of the transmission arrangement in a motor vehicle causes a reduction in consumption and emissions, in particular a reduction in the $CO_2$ emissions.

Furthermore, by way of the utilization of the actuator unit to actuate the clutch and to actuate the pump, synergies are utilized and a cost-optimized construction is ensured.

Developments of the invention are specified in the dependent claims, the description and the appended drawings.

The pump can preferably be actuated by means of the actuator unit via a lever mechanism, with the result that the lubricant is conveyed from the lubricant sump into the lubricant reservoir.

The actuator unit preferably has an actuator element, it being possible for the actuator element to be actuated by means of an actuator.

The actuation of the actuator element takes place, for example, electrically, electrohydraulically, electromagnetically, mechanically, hydraulically or magnetically.

The actuator element is configured and operatively connected to the lever mechanism in such a way that the pump can be actuated upon actuation of the actuator element by way of the actuator via the lever mechanism.

An active actuation of the pump is achieved in this way in a simple manner.

In one preferred embodiment, the actuator element is of substantially annular configuration and preferably has a slotted guide section on its outer circumference, which slotted guide section is operatively connected to the lever mechanism.

In one advantageous design variant of the transfer case according to the invention, the lever mechanism has a lever which can be pivoted about a pivot point, the lever having a first end and a second end. The lever is operatively connected in an articulated manner via the first end to the actuator element and via the second end to a pump piston of the pump.

The actuator unit particularly preferably has a ramp mechanism which can be actuated by means of the actuator, with a fixedly arranged first ramp disk and a second ramp disk which can be moved axially and rotationally relative to the first ramp disk, the second ramp disk being configured as an actuator element and being operatively connected to the actuator. Here, the second ramp disk of the ramp mechanism is preferably configured in such a way that firstly an actuation of the clutch unit and secondly an actuation of the pump take place upon an axial movement of the second ramp disk.

The term "axial" corresponds to a direction along or parallel to a central rotational axis of the ramp mechanism.

The pump is preferably arranged in such a way that it is connected on a pump suction side to the lubricant sump and on a pump pressure side to the lubricant reservoir.

The lubricant reservoir is preferably connected fluidically via a lubricant distributor to at least one transmission component to be lubricated.

It is possible in this way to realize lubrication and/or cooling of transmission components in a targeted manner by means of lubricant from the lubricant reservoir. The transport of the lubricant out of the lubricant reservoir to components and/or lubricating points to be lubricated of the transmission arrangement takes place, for example, via lubricant distributors within the transmission arrangement.

The transmission arrangement preferably comprises a housing, the lubricant sump being configured in the housing.

The actuator element, the lever mechanism and the pump are particularly preferably arranged in the housing.

The configuration of a housing as mentioned above and, in particular, the arrangement of the actuator element, the lever mechanism and the pump in the housing ensure a particularly compact and simple construction of the transmission arrangement.

DRAWINGS

Figure 2:
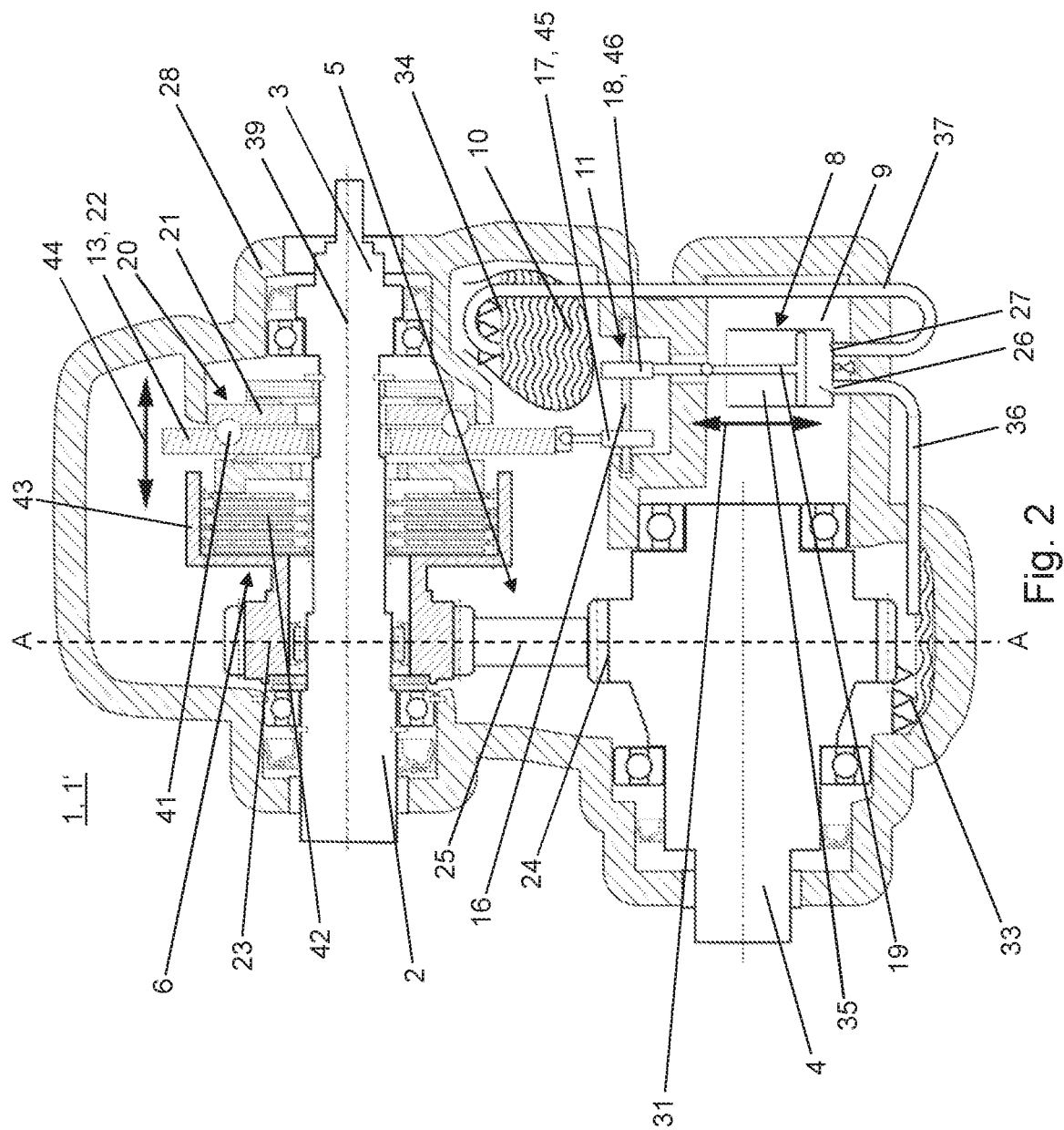
Figure 3:
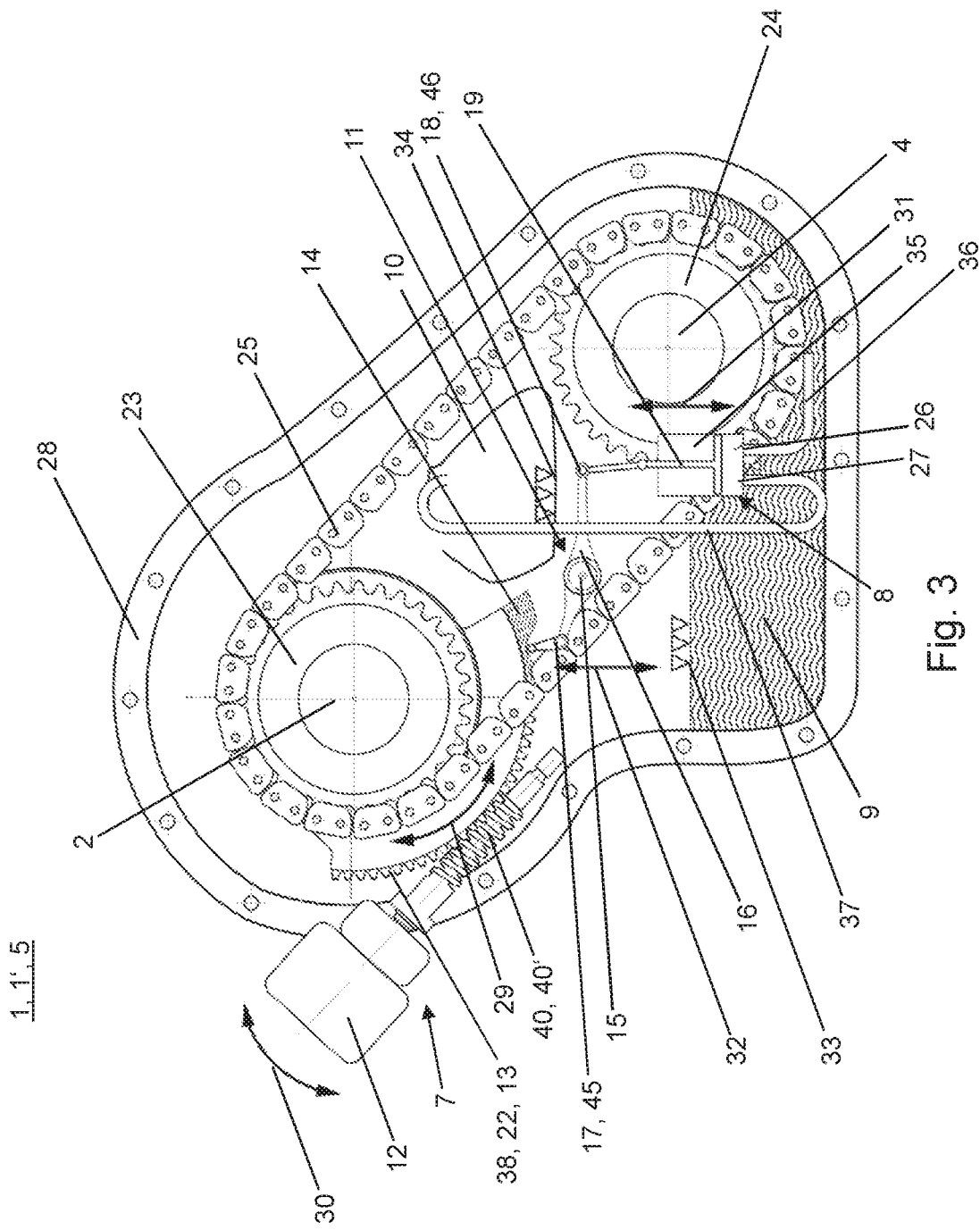
Figure 4:
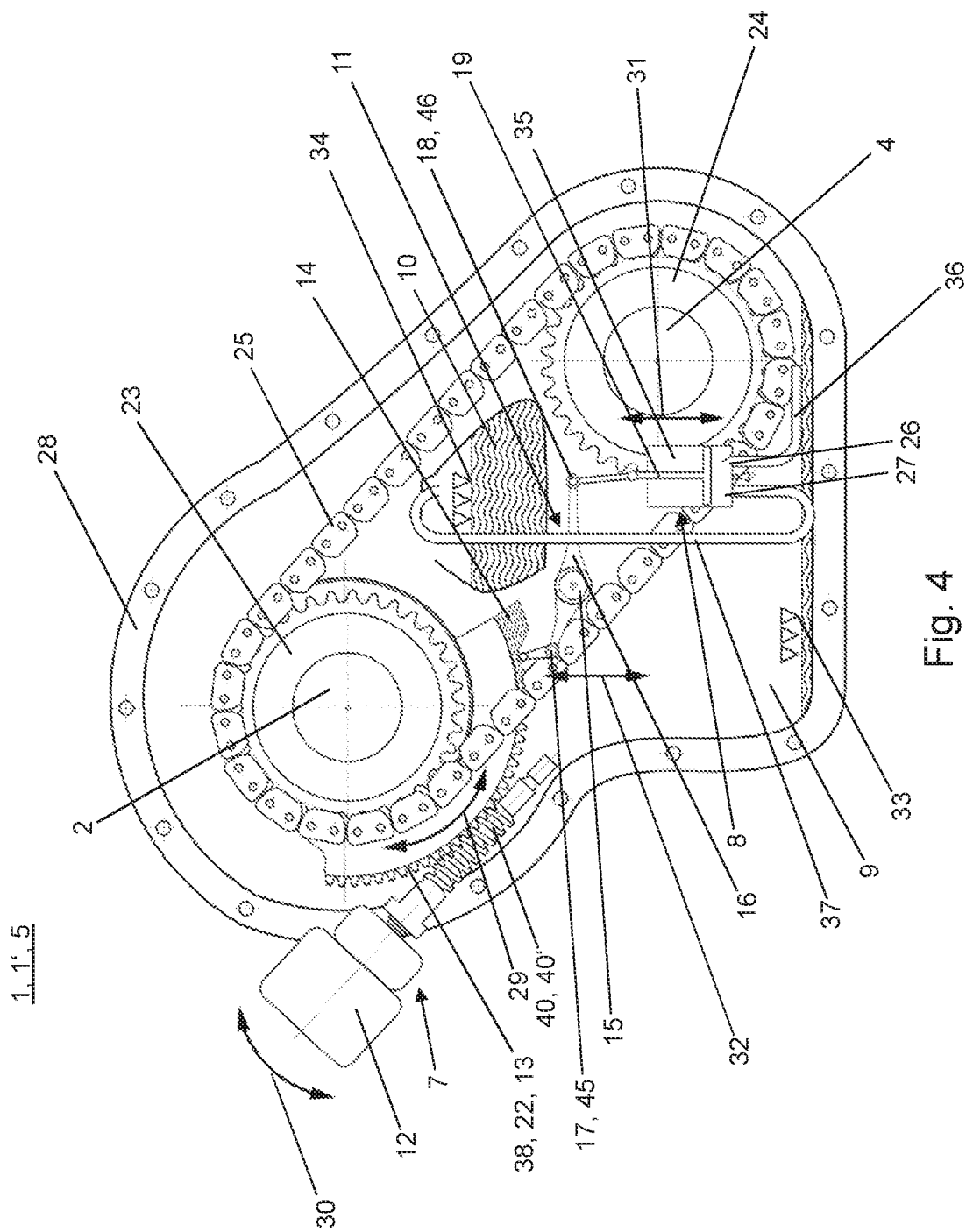
Figure 5:
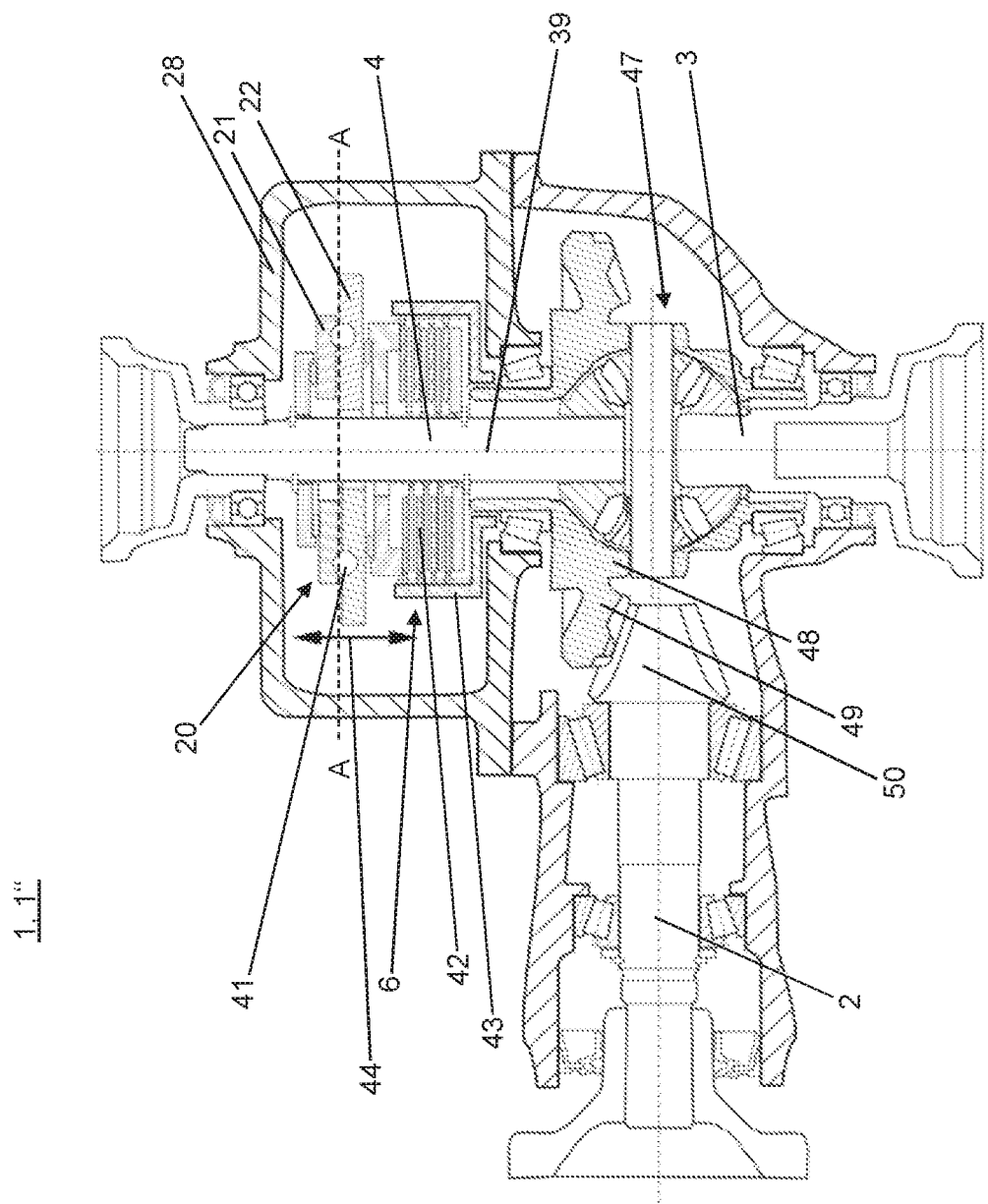
Figure 6:
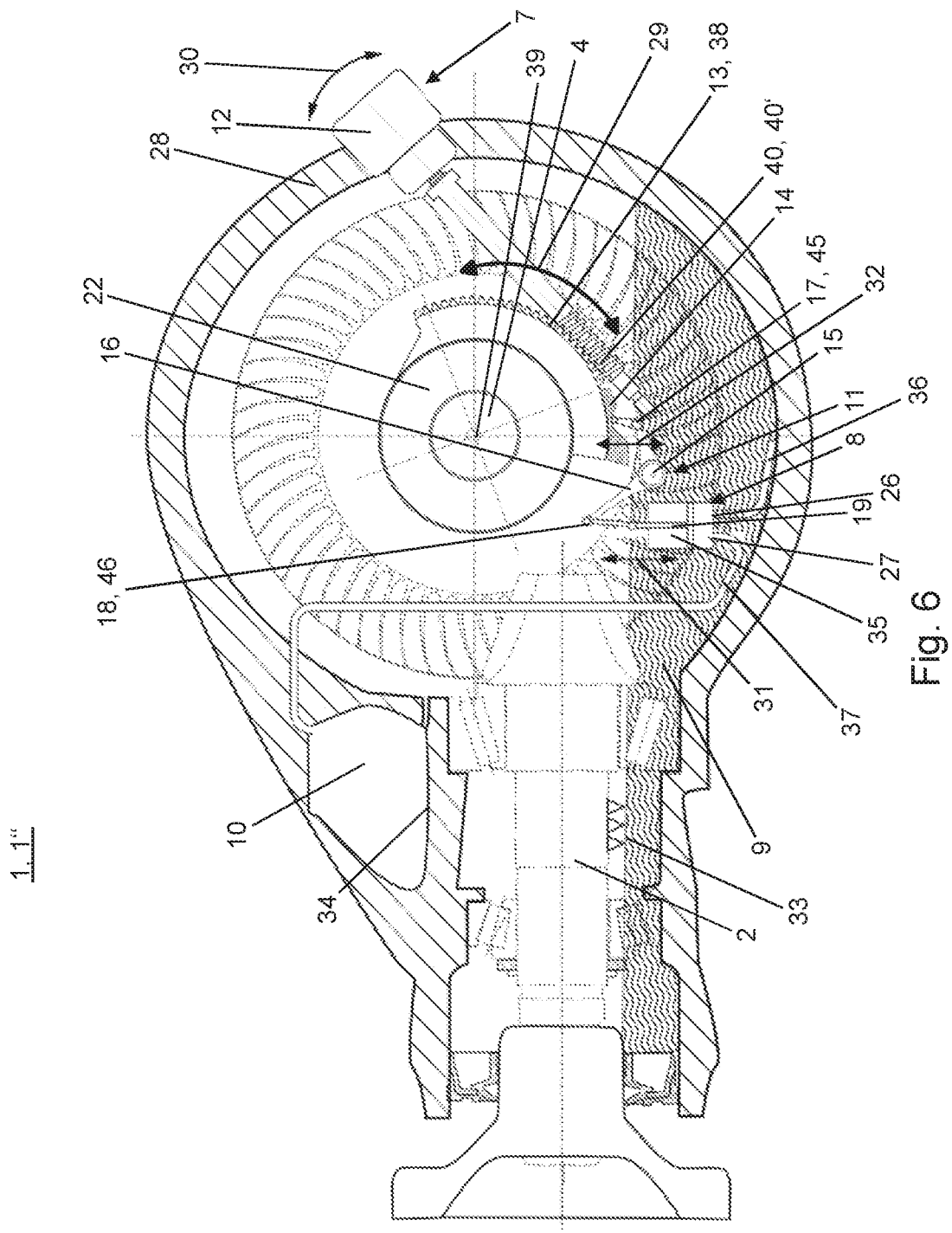
Figure 7:
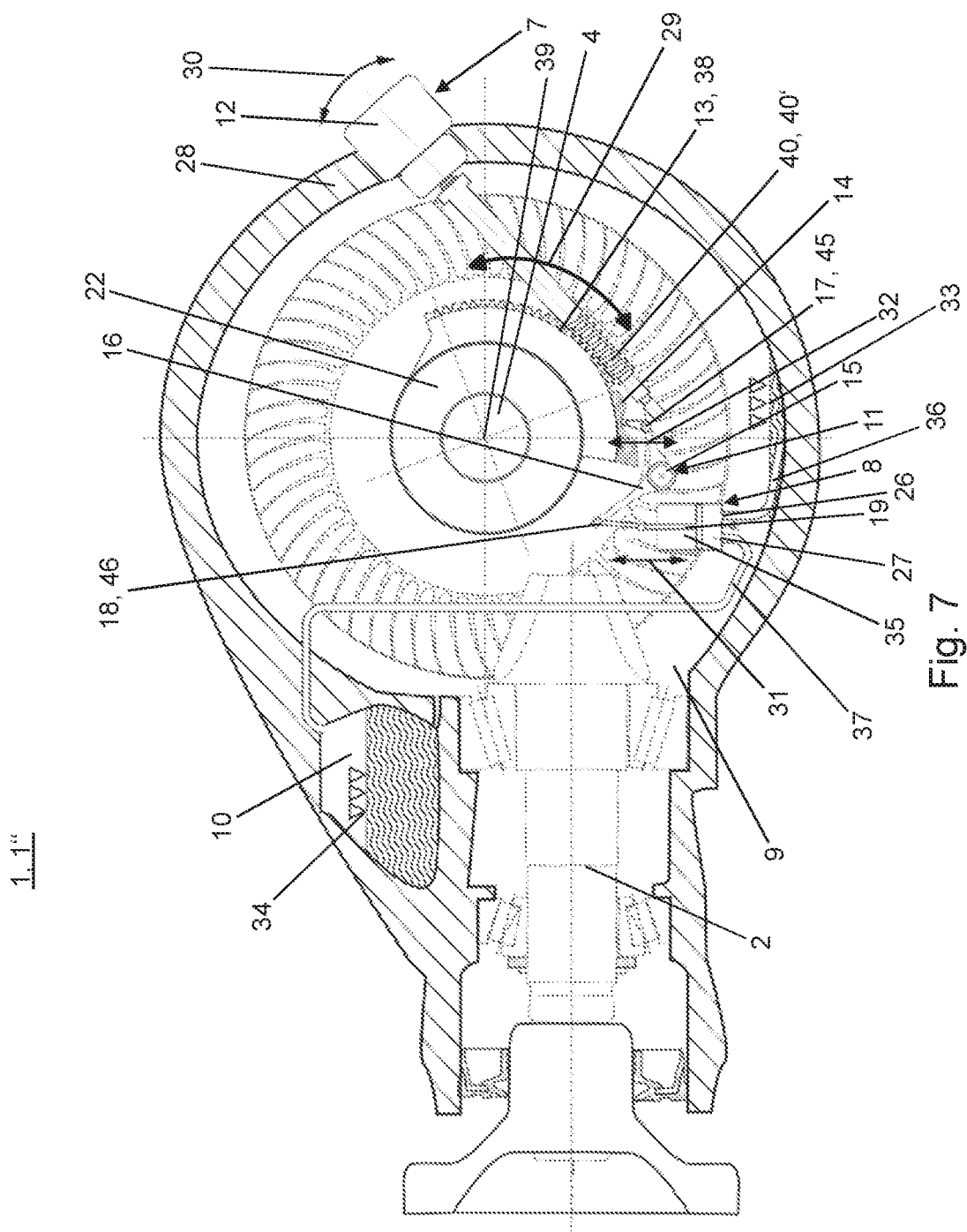

The invention will be described in the following text by way of example with reference to the drawings, in which:

FIG. 1 shows a sectional view of an exemplary transmission arrangement with a maximum first lubricant filling level in a lubricant sump, FIG. 2 shows a sectional view of an exemplary transmission arrangement with a maximum second lubricant filling level in a lubricant reservoir, FIG. 3 shows a sectional view along the plane A-A of an exemplary transmission arrangement in accordance with FIG. 1, FIG. 4 shows a sectional view along the plane A-A of an exemplary transmission arrangement in accordance with FIG. 2, FIG. 5 shows a sectional view of a further exemplary transmission arrangement, FIG. 6 shows a sectional view along the plane A-A of a transmission arrangement in accordance with FIG. 5 with a maximum first lubricant filling level in a lubricant sump, FIG. 7 shows a sectional view along the plane A-A of a transmission arrangement in accordance with FIG. 5 with a maximum second lubricant filling level in a lubricant reservoir, FIG. 8 shows a perspective illustration of an actuator element, FIG. 9 shows a sectional view of an actuator element in accordance with FIG. 8, and FIG. 10 shows a lever mechanism.

DESCRIPTION

FIG. 1 to FIG. 7 show two different exemplary transmission arrangements 1 in relation to the present invention. The exemplary transmission arrangement 1 which is shown in FIG. 1-FIG. 4 is a transfer case 1' of a motor vehicle. The exemplary transmission arrangement 1 which is shown in FIG. 5-FIG. 7 is an axle drive 1" of a motor vehicle.

FIG. 1 shows a sectional view of the transfer case 1, 1' with a maximum first lubricant filling level 33 in a lubricant sump 9.

FIG. 6 shows a sectional view of the axle drive 1, 1" with a maximum first lubricant filling level 33 in a lubricant sump 9.

FIG. 2 shows a sectional view of the transfer case 1, 1' with a maximum second lubricant filling level 34 in a lubricant reservoir 10.

FIG. 7 shows a sectional view of the axle drive 1, 1" with a maximum second lubricant filling level 34 in a lubricant reservoir 10.

The transfer case 1, 1' which is shown in FIG. 1 to FIG. 4 has a housing 28, an input shaft 2, a first output shaft 3 and a second output shaft 4.

The input shaft 2 of the transfer case 1, 1' is drive-connected via a motor vehicle main transmission (not shown) to a drive engine (not shown) of the motor vehicle, and transmits drive power to the first output shaft 3 of the transfer case 1, 1' and/or the second output shaft 4 of the transfer case 1'.

The first output shaft 3 of the transfer case 1, 1' is drive-connected, for example, to a first motor vehicle axle, such as the rear axle of a motor vehicle.

The second output shaft 4 of the transfer case 1, 1' is drive-connected, for example, to a second motor vehicle axle, such as the front axle of the motor vehicle.

The first output shaft 3 of the transfer case 1, 1' is arranged substantially coaxially with respect to the input shaft 2 of the transfer case 1, 1', and is drive-connected to the input shaft 2 of the transfer case 1, 1'.

The second output shaft 4 of the transfer case 1, 1' is arranged offset in parallel with respect to the input shaft 2, and can be drive-connected via an offset drive 5 and a clutch unit 6 to the input shaft 2, with the result that drive power can be transmitted from the input shaft 2 to the first output shaft 3 of the transfer case 1, 1' and to the second output shaft 4 of the transfer case 1, 1'.

FIG. 3 and FIG. 4 show a sectional view of the exemplary transfer case 1, 1' from FIG. 1 and FIG. 2 along the sectional plane A-A, the offset drive 5 of the transfer case 1, 1' being shown here, in particular.

FIG. 3 shows the offset drive 5 of the transfer case 1, 1' in accordance with FIG. 1, that is to say a transfer case 1, 1' with a maximum first lubricant filling level 33 in a lubricant sump 9.

FIG. 4 shows the offset drive 5 of the transfer case 1, 1' in accordance with FIG. 2, that is to say a transfer case 1, 1' with a maximum second lubricant filling level 34 in a lubricant reservoir 10.

The offset drive 5 of the transfer case 1, 1' has a first gearwheel 23 which is arranged on the input shaft 2, and a second gearwheel 24 which is arranged fixedly on the second output shaft 4 so as to rotate with it, the first gearwheel 23 and the second gearwheel 24 being drive-connected via a traction mechanism 25 (here, a chain).

The second gearwheel 24 is arranged partially in the lubricant sump 9, that is to say the second gearwheel 24 splashes in the lubricant which is situated in the lubricant sump 9.

The clutch unit 6 of the transfer case 1, 1' is configured as a multiple disk clutch with a multiplicity of outer disks and a multiplicity of inner disks, all the outer disks and inner disks configuring a multiple disk assembly 42.

The outer disks of the clutch unit 6 of the transfer case 1, 1' are connected to a clutch basket 43, the clutch basket 43 being drive-connected to the first gearwheel 23 of the offset drive 5.

The inner disks of the clutch unit 6 of the transfer case 1, 1' are drive-connected to the input shaft 2.

The axle drive 1, 1" which is shown in FIG. 5 to FIG. 7 likewise has the housing 28, the input shaft 2 with a bevel gear 50, the first output shaft 3 and the second output shaft 4.

The input shaft 2 of the axle drive 1, 1" is drive-connected via an axle differential 47 to the first output shaft 3 and the second output shaft 4, and transmits drive power to the first output shaft 3 and/or the second output shaft 4 of the axle drive 1, 1".

The first output shaft 3 of the axle drive 1, 1" is drive-connected to a first wheel of the rear axle or the front axle of a motor vehicle.

The second output shaft 4 of the axle drive 1, 1" is drive-connected to a second wheel of the rear axle or the front axle of a motor vehicle.

The first output shaft 3 is arranged substantially normally with respect to the input shaft 2 of the axle drive 1, 1", and is drive-connected to the input shaft 2 via the axle differential 47.

The second output shaft 4 is likewise arranged substantially normally with respect to the input shaft 2 of the axle drive 1, 1", and is drive-connected to the input shaft 2 via the axle differential 47.

The axle differential 47 can be locked via the clutch unit 6 in such a way that compulsory synchronization of the first output shaft 3 and the second output shaft 4 is ensured.

The clutch unit 6 of the axle drive 1, 1" is configured as a multiple disk clutch with a multiplicity of outer disks and a multiplicity of inner disks, all the outer disks and inner disks configuring the multiple disk assembly 42.

The outer disks of the clutch unit 6 of the axle drive 1, 1" are connected to the clutch basket 43, the clutch basket 43 being drive-connected to a differential cage 48 of the axle differential 47. A ring gear 49 is connected rigidly to the differential cage 48 of the axle differential 47, the ring gear 49 being in engagement with the bevel gear 50 of the input shaft 2.

The inner disks of the clutch unit 6 of the axle drive 1, 1" are drive-connected to the second output shaft 4.

The ring gear 49 of the differential cage 48 is arranged partially in the lubricant sump 9, that is to say the ring gear 49 splashes in the lubricant which is situated in the lubricant sump 9.

Furthermore, the two exemplary transmission arrangements 1, namely the transfer case 1' and the axle drive 1", comprise an actuator unit 7 which serves firstly to actuate the clutch unit 6. Secondly, a pump 8 can be actuated by means of the actuator unit 7 via a lever mechanism 11, with the result that the lubricant is conveyed from the lubricant sump 9 into the lubricant reservoir 10.

The pump 8 is arranged in the region of the lubricant sump 9 and has a pump space 35 and a pump piston 19, it being possible for the pump piston 19 to be moved in the pump space 35 in a rectilinear manner. The movement of the pump piston 19 in the pump space 35 is shown diagrammatically by way of a third arrow 31 in FIG. 1, FIG. 2, FIG. 3, FIG. 4 and in FIG. 6 and FIG. 7. The pump space 35 of the pump 8 is connected on a pump suction side 26 via a suction line 36 to the lubricant sump 9. On a pump pressure side 27, the pump space 35 of the pump 8 is connected via a pressure line 37 to the lubricant reservoir 10.

The pump 8 can be actuated in such a way that it conveys lubricant out of the lubricant sump 9 into the lubricant reservoir 10.

The lubricant sump 9 is configured in an integrated manner in the housing 28.

The lubricant sump 9 contains lubricant up to a first lubricant filling level 33.

The lubricant reservoir 10 contains lubricant up to a second lubricant filling level 34.

The lubricant reservoir 10 is connected fluidically via at least one lubricant distributor to at least one transmission component to be lubricated and/or cooled of the respective transmission arrangement 1, 1', 1".

The actuator unit 7 has an actuator element 13, it being possible for the actuator element 13 to be actuated by means of an actuator 12.

The actuation of the actuator element 13 takes place in the respective transmission arrangement 1, 1', 1" in each case electrically by means of an electric motor which adjusts the actuator element 13 via a reduction gear 40. The resulting movement of the actuator element 13 is shown diagrammatically by way of a first arrow 29 in FIG. 3 and FIG. 4, and in FIG. 6 and FIG. 7. The (rotational) movement of the actuator 12, that is to say of the electric motor, and therefore of an output element 40' of the reduction gear 40 is shown diagrammatically by way of a second arrow 30 in FIG. 3 and FIG. 4, and in FIG. 6 and FIG. 7.

The actuator element 13 is configured and operatively connected to the lever mechanism 11 in such a way that the pump 8 can be actuated upon actuation of the actuator element 13 by way of the actuator 12 via the lever mechanism 11.

The actuator unit 7 of the respective transmission arrangement 1, 1', 1" which is shown in FIG. 1 to FIG. 4 and in FIG. 5 to FIG. 7 comprises a ramp mechanism 20 which can be actuated by means of the actuator 12.

The ramp mechanism 20 has a first ramp disk 21 which is fixed on the housing and a second ramp disk 22 which can be moved rotationally and axially, that is to say in the direction of a central rotational axis 39 of the ramp mechanism 20, relative to the first ramp disk 21, the second ramp disk 22 being configured as an actuator element 13. The axial movement of the second ramp disk 22 relative to the first ramp disk 21 is shown diagrammatically by means of a fifth arrow 44 in FIG. 1 and FIG. 2, and in FIG. 5.

The first ramp disk 21 and the second ramp disk 22 are drive-connected via at least three balls 41, the balls 41 being arranged movably in ball ramps which are configured on the mutually facing sides of the first ramp disk 21 and the second ramp disk 22. The variable depths of the ball ramps results in an axial movement of the second ramp disk 22 relative to the first ramp disk 21 upon actuation of the ramp mechanism 20 by way of the actuator 12.

The second ramp disk 22 of the ramp mechanism 20 is configured in such a way that, upon a rotational, axial movement of the second ramp disk 22, firstly an actuation of the clutch unit 6 and secondly an actuation of the pump 8 take place.

In the case of the transfer case 1, 1' (FIG. 1-FIG. 4), the ramp mechanism 20 is arranged coaxially with respect to the input shaft 2 and therefore coaxially with respect to the first output shaft 3; the first ramp disk 21 and the second ramp disk 22 are arranged on the input shaft 2, the first ramp disk 21 being fastened fixedly to the housing 28 so as to rotate with it, and the second ramp disk 22 being arranged such that it can be moved axially and can be rotated on the input shaft 2.

In the case of the axle drive 1, 1" (FIG. 5-FIG. 6), the ramp mechanism 20 is arranged coaxially with respect to the second output shaft 4 of the axle drive 1, 1" and therefore coaxially with respect to the first output shaft 3. The first ramp disk 21 and the second ramp disk 22 are arranged on the second output shaft 4, the first ramp disk 21 being supported axially via an axial needle bearing on a supporting disk which is connected fixedly to the second output shaft 4 so as to rotate with it, and the second ramp disk 22 being arranged such that it can be moved axially and can be rotated on the second output shaft 4.

The second ramp disk 22 is of substantially annular configuration and, on its outer circumference, has a toothing section 38 and a slotted guide section 14. The slotted guide section 14 is provided with alternating crests and troughs in a similar manner to a wavy line (FIG. 8, FIG. 9).

One exemplary embodiment of the second ramp disk is shown in FIG. 8 and FIG. 9.

The toothing section 38 is operatively connected to the actuator 12 of the actuator unit 7.

The slotted guide section 14 is operatively connected to the lever mechanism 11.

By way of an actuation of the clutch unit 6 by means of the actuator unit 7, the multiple disk assembly 42 of the clutch unit 6 is pressed together and a frictionally locking connection of outer disks and inner disks occurs, from which, in the case of the transfer case 1, 1' (FIG. 1-FIG. 4), a transmission of the drive power of the input shaft 2 takes place to the clutch basket 43 and therefore to the second gearwheel 24. In this way, drive power is transmitted from the input shaft 2 to the first output shaft 3 and the second output shaft 4. In the case of the axle drive 1, 1" (FIG. 5-FIG. 7), the multiple disk assembly 42 of the clutch unit 6 is pressed together by way of an actuation of the clutch unit 6 by means of the actuator unit 7, and a frictionally locking connection of outer disks and inner disks occurs, from which locking of the axle differential 47 results via locking of the differential cage, which ensures compulsory synchronization of the first output shaft 3 and the second output shaft 4.

FIG. 10 shows an exemplary lever mechanism 11. The lever mechanism 11 has a lever 16 which can be rotated about a rotational axis 15, the lever 16 having a first end 17 and a second end 18. In the present exemplary embodiment, the lever 16 of the lever mechanism is mounted in the housing 28 via its two ends 17, 18 such that it can be rotated about the rotational axis 15. The lever 16 of the lever mechanism 11 is actuated or positively guided on the slotted guide section 14 of the second ramp disk 22 via a first lever arm 45 which is connected fixedly to the first end 17 of the lever 16, and is connected in an articulated manner to a pump piston 19 of the pump 8 via a second lever arm 46 which is connected in an articulated manner to the second end 18 of the lever 16. The first lever arm 45 therefore bears against the wave-shaped slotted guide section 14.

The slotted guide section 14 of the second ramp disk 22, the lever mechanism 11 and the pump 8 are configured in such a way that the movement of the second ramp disk 22 and therefore the movement of the slotted guide section 14 of the second ramp disk 22 in accordance with the first arrow 29 result in a rectilinear movement of the pump piston 19 within the pump space 35 of the pump 8 in accordance with the third arrow 31.

The actuator element 13, the lever mechanism 11 and the pump 8 are arranged in the housing 28.

That lubricant filling level situation in the lubricant sump 9 and in the lubricant reservoir 10 which is shown diagrammatically in FIG. 1 and FIG. 3 and in FIG. 6 corresponds to an operating state of the respective transmission arrangement 1, 1', 1", in which operating state the pump 8 is not actuated by means of the actuator unit 7, that is to say an operating state of the transmission arrangement 1, 1', 1" in the case of a stationary pump 8. This operating state prevails during starting up of the pump 8.

FIG. 1, FIG. 3 and FIG. 6 diagrammatically show the maximum first lubricant filling level 33 in the lubricant sump 9 and the minimum second lubricant filling level 34 in the lubricant reservoir 10.

In that operating state of the transfer case 1, 1' which is shown in FIG. 1 and FIG. 3, the second gearwheel 24 dips partially into the lubricant which is situated in the lubricant sump 9.

In that operating state of the axle drive 1, 1" which is shown in FIG. 6, the ring gear 49 of the differential cage 48 dips partially into the lubricant which is situated in the lubricant sump 9.

The actuation of the actuator element 13 (here, the second ramp disk 22) by means of the actuator 12 leads to a movement of the slotted guide section 14 which is configured on the outer circumference of the second ramp disk 22 in accordance with the first arrow 29. The slotted guide section 14 of the second ramp disk 22 interacts with the first lever arm 45 which is connected fixedly first end 17 of the lever 16, in such a way that a movement of the first end 17 of the lever 16 in accordance with a fourth arrow 32 takes place upon a movement of the slotted guide section 14 in accordance with the first arrow 29. As a result of the configuration of the lever mechanism 11, the movement of the first end 17 of the lever 16 in accordance with the fourth arrow 32 results in a movement of the second end 18 of the lever 16 and therefore of the pump piston 19 of the pump 8 in accordance with the first arrow 29; the pump 8 conveys lubricant out of the lubricant sump 9 into the lubricant reservoir 10. The second end 18 of the lever 16 and the pump piston 19 are connected via a second lever arm 46 which is arranged in an articulated manner. The transport of lubricant out of the lubricant sump 9 into the lubricant reservoir 10 takes place until the minimum first lubricant filling level 33 in the lubricant sump 9 and/or the maximum second lubricant filling level 34 in the lubricant reservoir 10 are/is reached (FIG. 2, FIG. 4, FIG. 7).

The actuator unit 7 therefore actuates the pump 8 via the lever mechanism 11.

That lubricant filling level situation in the lubricant sump 9 and in the lubricant reservoir 10 which is shown diagrammatically in FIG. 2 and FIG. 4 and in FIG. 7 corresponds to an operating state of the transmission arrangements 1, 1', 1", in which operating state the pump 8 was in operation, that is to say that lubricant was transported out of the lubricant sump 9 into the lubricant reservoir 10.

FIG. 2, FIG. 4 and FIG. 7 diagrammatically show the minimum first lubricant filling level 33 of the lubricant sump 9 and the maximum second lubricant filling level 34 of the lubricant reservoir 10.

In that operating state of the transfer case 1, 1' which is shown in FIG. 2 and FIG. 4, the second gearwheel 24 no longer dips into the lubricant which is situated in the lubricant sump 9; the lubricant has been transported via the pump 8 from the lubricant sump 9 into the lubricant reservoir 10.

In that operating state of the axle drive 1, 1" which is shown in FIG. 7, the ring gear 49 of the differential cage 48 no longer dips into the lubricant which is situated in the lubricant sump 9; the lubricant has been transported via the pump 8 from the lubricant sump 9 into the lubricant reservoir 10.

From the lubricant reservoir 10, the lubricant is guided via lubricant distributors to the desired lubricating and/or cooling points of the respective transmission arrangement 1, 1', 1", from where it passes back into the lubricant sump 9 again.

LIST OF DESIGNATIONS

1 Transmission arrangement
1' Transfer case
1" Axle drive
2 Input shaft
3 First output shaft
4 Second output shaft
5 Offset drive
6 Clutch unit
7 Actuator unit
8 Pump
9 Lubricant sump
10 Lubricant reservoir
11 Lever mechanism
12 Actuator
13 Actuator element
14 Slotted guide section
15 Pivot point
16 Lever
17 First end
18 Second end
19 Pump piston
20 Ramp mechanism
21 First ramp disk
22 Second ramp disk
23 First gearwheel
24 Second gearwheel
25 Traction mechanism
26 Pump suction side
27 Pump pressure side
28 Housing
29 First arrow
30 Second arrow
31 Third arrow
32 Fourth arrow
33 First lubricant filling level
34 Second lubricant filling level
35 Pump space
36 Suction line
37 Pressure line
38 Toothing section
39 Central rotational axis (of the ramp mechanism)
40 Reduction gear
40' Output element (of the reduction gear)
41 Ball
42 Multiple disk assembly
43 Clutch basket
44 Fifth arrow
45 First lever arm
46 Second lever arm
47 Axle differential
48 Differential cage
49 Ring gear
50 Bevel gear

What is claimed is:

1. A transmission arrangement for a motor vehicle comprising at least one clutch unit and at least one actuator unit, it being possible for the clutch unit to be actuated by means of the actuator unit, wherein a pump can additionally be actuated by means of the actuator unit via a lever mechanism, with the result that lubricant is conveyed from a lubricant sump into a lubricant reservoir.

2. The transmission arrangement as claimed in claim 1, wherein the actuator unit has an actuator element which can be actuated by means of an actuator, the actuator element being configured and connected to the lever mechanism in such a way that the pump can be actuated upon actuation of the actuator element via the lever mechanism.

3. The transmission arrangement as claimed in claim 2, wherein the actuator element is of substantially annular configuration and has a slotted guide section on its outer circumference, the slotted guide section being operatively connected to the lever mechanism.

4. The transmission arrangement as claimed in claim 2, wherein the actuator unit has a ramp mechanism which can be actuated by means of the actuator, with a fixedly arranged first ramp disc and a second ramp disc which can be moved axially relative to the first ramp disc, the second ramp disc being configured as the actuator element.

5. The transmission arrangement as claimed in claim 4, wherein the second ramp disc of the ramp mechanism is configured in such a way that, upon axial movement of the second ramp disc, firstly an actuation of the clutch unit and secondly an actuation of the pump take place.

6. The transmission arrangement as claimed in claim 2, wherein the transmission arrangement comprises a housing, the lubricant sump being configured in an integrated manner in the housing.

7. The transmission arrangement as claimed in claim 6, wherein the actuator element, the lever mechanism and the pump are arranged in the housing.

8. The transmission arrangement as claimed in claim 2, wherein the transmission arrangement is a transfer case comprising a housing and first and second shafts rotatably supported by the housing, wherein the clutch unit is disposed within the housing between the first and second shafts, wherein the actuator element is disposed within the housing and is moveable relative to the clutch unit in response to actuation of the actuator; wherein such movement of the actuator element actuates the clutch unit for causing drive power to be transferred from the first shaft to the second shaft, and wherein such movement of the actuator element further causes the lever mechanism to actuate the pump and convey lubricant from the lubricant sump to the lubricant reservoir.

9. The transmission arrangement as claimed in claim 8, wherein the lever mechanism includes a lever pivotably supported in the housing, a first lever arm extending from the lever and engaging the actuator element, and a second lever arm extending from the lever and being operatively connected to a moveable pump element of the pump, and wherein movement of the actuator element causes the first lever arm to pivot the lever which causes the second lever arm to move the pump element of the pump so as to actuate the pump and convey lubricant.

10. The transmission arrangement as claimed in claim 9, wherein the actuator element includes a guide section configured to convert movement of the actuator element into pivotal movement of the lever mechanism.

11. The transmission arrangement as claimed in claim 10, wherein the lubricant sump and the lubricant reservoir are arranged within the housing, wherein the pump includes a pump space provided within the housing, wherein the pump element is a pump piston disposed within the pump space for translational movement in response to pivotal movement of the lever mechanism, and wherein the second lever arm is connected in an articulated manner to the pump piston.

12. The transmission arrangement as claimed in claim 2, wherein the transmission arrangement is an axle drive comprising a housing, an input shaft rotatably supported by the housing, an axle differential rotatably supported within the housing and having a differential cage drive-connected to the input shaft, and first and second output shafts rotatably supported by the housing and being drive-connected to the axle differential, wherein the clutch unit is disposed within the housing and is operably arranged between the differential cage of the axle differential and one of the first and second output shafts, wherein the actuator element is disposed within the housing and is moveable relative to the clutch unit in response to actuation of the actuator, wherein such movement of the actuator element actuates the clutch unit and further causes the lever mechanism to actuate the pump.

13. The transmission arrangement as claimed in claim 12, wherein the lever mechanism includes a lever pivotably supported in the housing, a first lever arm extending from the lever and engaging the actuator element, and a second lever arm extending from the lever and being operatively connected to a moveable pump element of the pump, and wherein movement of the actuator element causes the first lever arm to pivot the lever which causes the second lever arm to move the pump element of the pump so as to actuate the pump and convey lubricant.

14. The transmission arrangement as claimed in claim 13, wherein the actuator element includes a guide section configured to convert movement of the actuator element into pivotal movement of the lever mechanism.

15. The transmission arrangement as claimed in claim 14, wherein the lubricant sump and the lubricant reservoir are arranged within the housing, wherein the pump includes a pump space provided within the housing, wherein the pump element is a pump piston disposed within the pump space for translational movement in response to pivotal movement of the lever mechanism, and wherein the second lever arm is connected in an articulated manner to the pump piston.

16. The transmission arrangement as claimed in claim 1, wherein the lever mechanism has a lever which can be pivoted about a pivot point, the lever having a first end and a second end, the lever being articulated via the first end on the actuator element and being connected in an articulated manner to a pump piston of the pump via the second end.

17. The transmission arrangement as claimed in claim 1, wherein the pump is connected on a pump suction side to the lubricant sump and is connected on a pump pressure side to the lubricant reservoir.

18. The transmission arrangement as claimed in claim 1, wherein the lubricant reservoir is connected fluidically via a lubricant distributor to at least one transmission component of the transmission arrangement to be lubricated and/or to be cooled.

* * * * *